US009374789B2

(12) United States Patent
Weast

(10) Patent No.: US 9,374,789 B2
(45) Date of Patent: *Jun. 21, 2016

(54) MAINTAINING NETWORK SERVICES ACROSS MULTIPLE PHYSICAL INTERFACES

(75) Inventor: John C. Weast, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 13/528,179

(22) Filed: Jun. 20, 2012

(65) Prior Publication Data

US 2012/0257613 A1   Oct. 11, 2012

Related U.S. Application Data

(63) Continuation of application No. 11/729,064, filed on Mar. 28, 2007, now Pat. No. 8,238,233.

(51) Int. Cl.
H04W 52/02 (2009.01)
H04W 40/10 (2009.01)

(52) U.S. Cl.
CPC .......... *H04W 52/0274* (2013.01); *H04W 40/10* (2013.01)

(58) Field of Classification Search
CPC .......... H04L 12/40039; H04L 1/0001; H04W 52/0274; H04W 40/10; H04W 52/0219; H04W 52/0225; H04W 52/028; H04W 52/02; H04W 52/0209; H04W 52/0251; H04W 52/029
USPC ............. 370/395.5, 402; 455/422.1, 574, 575
See application file for complete search history.

(56) References Cited

U.S. PATENT DOCUMENTS

| 7,233,792 | B2 | 6/2007 | Chang |
| 7,421,602 | B2 | 9/2008 | Sutardja |
| 7,975,079 | B2 | 7/2011 | Bennett et al. |
| 2002/0083351 | A1* | 6/2002 | Brabenac ...................... 713/300 |
| 2002/0160769 | A1* | 10/2002 | Gray ............................. 455/423 |
| 2004/0001470 | A1* | 1/2004 | Chen ............................. 370/338 |
| 2004/0219955 | A1 | 11/2004 | daCosta |
| 2004/0224728 | A1* | 11/2004 | Dacosta et al. ............... 455/574 |
| 2004/0258051 | A1 | 12/2004 | Lee |
| 2005/0085245 | A1 | 4/2005 | Danneels |
| 2005/0085248 | A1* | 4/2005 | Ballay et al. .................. 455/500 |
| 2005/0182980 | A1* | 8/2005 | Sutardja ........................ 713/320 |
| 2006/0211400 | A1* | 9/2006 | Bauman et al. ............ 455/343.1 |
| 2007/0211725 | A1* | 9/2007 | Kawata et al. ................ 370/392 |
| 2008/0002605 | A1 | 1/2008 | Todd et al. |
| 2008/0013504 | A1 | 1/2008 | Nishibayashi et al. |
| 2009/0077347 | A1 | 3/2009 | Edwards |
| 2010/0157868 | A1* | 6/2010 | Yam .............................. 370/311 |

OTHER PUBLICATIONS

Yuan Saint-Hilaire, "Intel AMT Developer Tool Kit: Technical Overview," Jan. 2007, pp. 1-4.

* cited by examiner

*Primary Examiner* — Awet Haile
(74) *Attorney, Agent, or Firm* — Trop, Pruner & Hu, P.C.

(57) ABSTRACT

In one embodiment, the present invention includes an apparatus having a central processing unit (CPU) to execute instructions, a hub coupled to the CPU, and multiple physical devices coupled to the hub. The physical devices may each correspond to a different network communication protocol, and may each include a physical unit to forward packets to the hub while the system is in a low power mode. The hub may remain enabled during the low power mode and may include media access control functionality for handling incoming packets of different physical devices. Other embodiments are described and claimed.

20 Claims, 2 Drawing Sheets

MAINTAINING NETWORK SERVICES ACROSS MULTIPLE PHYSICAL INTERFACES

This application is a continuation of U.S. patent application Ser. No. 11/729,064, filed Mar. 28, 2007 the content of which is hereby incorporated by reference.

BACKGROUND

Today's computer systems include many different components and physical interconnects to interconnect a given platform to various devices. In systems for the digital office and home, these different physical interconnects may include in addition to Ethernet connections, various wireless connections such as a so-called Wi-Fi connection in accordance with an Institute of Electrical and Electronics Engineers (IEEE) 802.11 standard such as an IEEE 802.11a/b/g standard, an ultra wideband (UWB) connection, a Bluetooth™ connection in accordance with a Bluetooth™ protocol, among many others.

A major issue in today's systems is reducing the amount of power consumed. Accordingly, various low power modes are available in many systems. However, to be able to remain interconnected for communication with these various physical interconnects, oftentimes many dedicated components within a system are required to remain powered on, reducing the benefits of low power states.

DETAILED DESCRIPTION

In various embodiments, a generic processing engine, such as may be present in a chipset of a system, may provide for performing certain protocol operations such as implemented in a media access control (MAC) unit to enable more of a given system to remain in a low power state, yet provide for connectivity to network packets received by the system. While the scope of the present invention is not limited in this regard, such a generic processing engine, which may be a general-purpose microprocessor, may be included in a chipset component such as a memory controller, input/output (I/O) controller or other such interface component. Note that this processing engine may be a generic application processor located in the chipset, with access to the different physical interfaces in the platform, which can then be used to provide network services across multiple physical interfaces.

Figure 1:
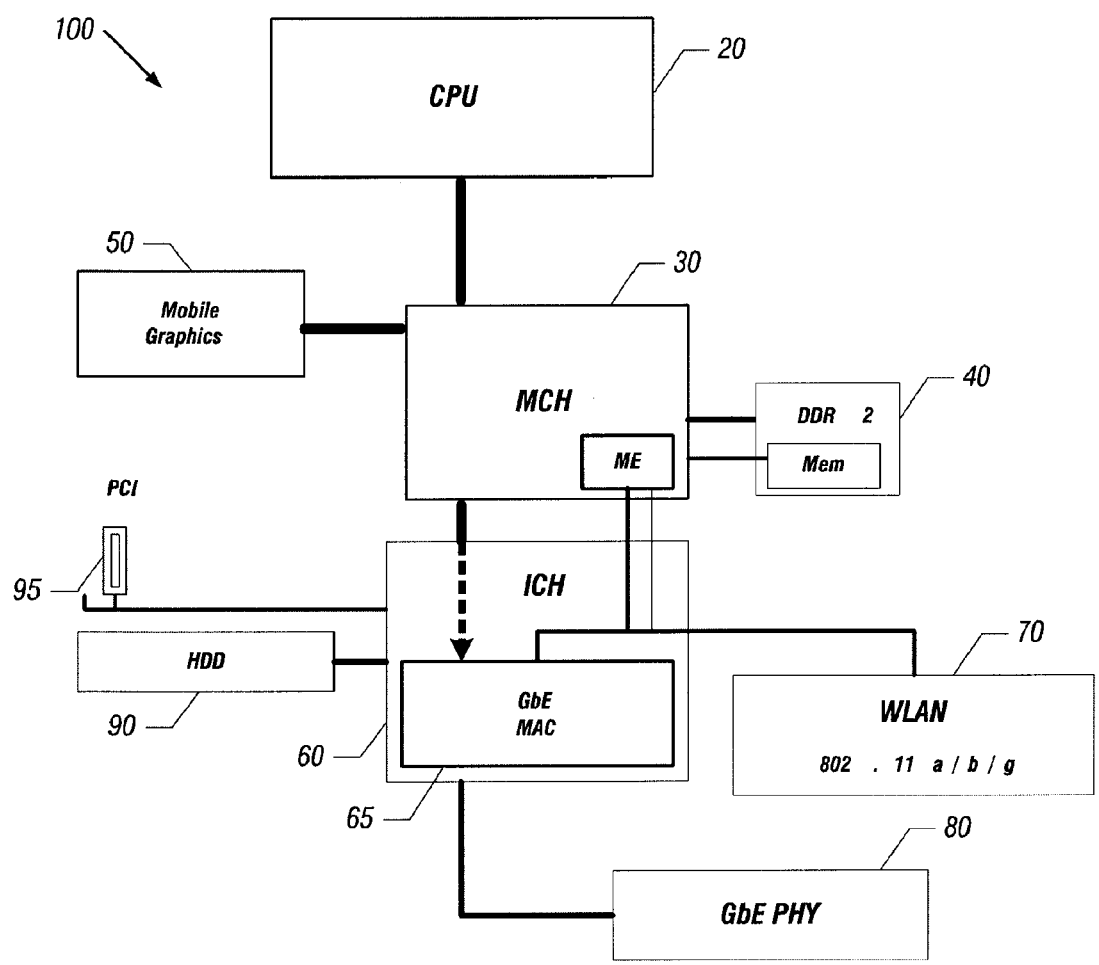
FIG. 1 is a block diagram of a system in accordance with an embodiment of the present invention.

Referring now to FIG. 1, shown is a block diagram of a system in accordance with an embodiment of the present invention. As shown in FIG. 1, system 10 includes a processor 20, which may be a microprocessor such as a multi-core processor. Processor 20 is coupled to a memory controller hub (MCH) 30 that includes a manageability engine (ME) 35. ME 35 may be configured to handle MAC features for various physical interconnects of system 10 to enable greater low power operation of system 10, while retaining network connectivity.

Still referring to FIG. 1, MCH 30 is coupled to a memory 40, which may be a dynamic random access memory (DRAM), e.g., a double data rate (DDR) memory. MCH 30 is further coupled to a graphics unit 50, which may be a graphics adaptor that in turn is provided to a display. In turn, MCH 30 is coupled to an I/O controller hub (ICH) 60. As shown, ICH 60 includes a MAC 65 such as a MAC unit of a gigabit Ethernet (GBE) network interface. In turn, ICH 60 is coupled to various physical interconnects, such as a wireless local area network (WLAN) adaptor 70, which may be in accordance with a given IEEE 802.11 standard or another local wireless protocol. Furthermore, ICH 60 is coupled to a physical (PHY) adaptor 80, which may be a network interconnect to an Ethernet network such as a GBE connection. ICH 60 is further coupled to a hard disk drive 90 and via a peripheral bus (e.g., a peripheral component interconnect (PCI) bus) to a PCI device 95, which may be a desired adaptor card or so forth. Note while shown with this particular implementation in the embodiment of FIG. 1, other implementations are possible. For example, in some implementations processor 20 may further include the components of MCH 30 and graphics unit 50, for example.

In various embodiments, ME 35 can provide network service aliveness across the multiple disparate physical network interfaces shown in FIG. 1. To enable ME 35 to provide service aliveness in a low power mode, various MAC-like components may be implemented in ME 35. For example, a generic port filter may be configured to execute on ME 35 such that the need for independent port filters for the various network devices shown in FIG. 1 can be avoided. In various embodiments, ME 35 may include hardware, software, firmware or combinations thereof to handle port filtering and processing of incoming packets when other portions of system 10 are in a low power state. Note in some embodiments the port filtering may be performed by combinations of software and/or firmware that execute on generic hardware of ME 35, allowing for a flexible framework for various usage scenarios. Furthermore, by handling packet detection response capabilities in ME 35, the cost of the associated physical interconnects may be reduced, as port filtering capabilities among other packet detection processing can be moved from the components to ME 35. To provide for a great deal of flexibility to both fine tune what interface source is maintained and how such services may be advertised on different interfaces, a configuration process may be performed in which a host (e.g., processor 20) may configure ME 35 to handle various packet types that may be associated with different network interfaces and the different applications, to be handled appropriately in a low power state.

Figure 2:
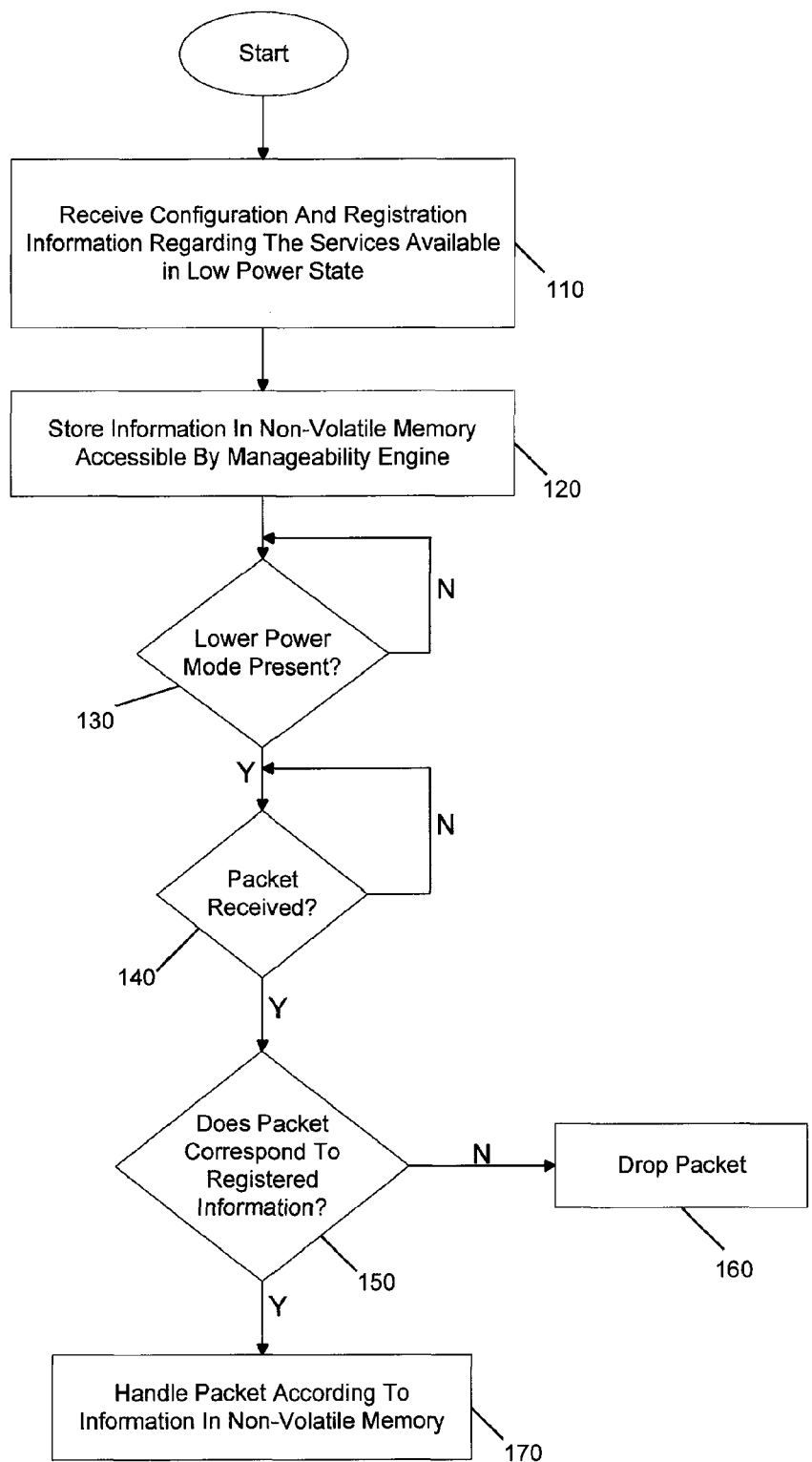
FIG. 2 is a flow diagram of a method in accordance with an embodiment of the present invention.

Referring now to FIG. 2, shown is a flow diagram of a method in accordance with an embodiment of the present invention. As shown in FIG. 2, method 100 may begin by receiving configuration and registration information regarding services available in a low power state (block 110). For example, in various implementations a processor may provide an ME with various information regarding different applications that are to possibly receive data while a system is in a low power state. The information may further correspond to given packet types, e.g., based on internet protocol (IP) address or so forth such as a port basis or in another manner, which may be used to handle incoming packets when in the low power mode. As shown in FIG. 2, such information may be stored in a non-volatile memory that is accessible by the ME (block 120). For example, in various embodiments a flash memory that may be present in a chipset in which ME is included, or another non-volatile memory to which it may have access can be used to store this information. Alternately, the information may be stored in a volatile memory where a host re-programs the memory every time before going to sleep. This information may be stored, for example, in a table that the ME can access when it receives an incoming packet during a low power mode.

Referring still to FIG. 2, during operation it may be determined whether a low power mode is present (diamond 130). For example, a processor such as processor 20 of FIG. 1 may send a message to ME 35 when it enters into a low power mode. If it is determined that the low power mode is present, next it may be determined whether an incoming packet is received at the ME from a given MAC unit in the system (diamond 140). If not, diamond 140 may loop back on itself. If an incoming packet is received, control passes to diamond 150 where it may be determined whether the packet corresponds to registered information (diamond 150). That is, it may be determined whether information associated with the packet, e.g., by way of port information, IP address information, packet type or so forth corresponds to data present in the non-volatile storage. If not, the packet may be dropped (block 160).

If instead the packet corresponds to the information in the non-volatile memory, the ME may handle the packet according to the information that is stored in the memory (block 170). For example, depending on the information stored in the memory that corresponds to the packet, the packet may be sent to a predetermined location, a wakeup signal may be sent to a given component, a response packet may be sent, e.g., in the example of a heartbeat message sent from a remote source or so forth. For example, if an incoming packet is a Bluetooth™ packet, certain limitations may exist in handling a packet in a low power mode. For example, such services as video streaming may not be provided due to limited available bandwidth, while a similar packet advertised over Ethernet may be handled. While shown with the particular implementation in the embodiment of FIG. 2, the scope of the present invention is not limited in this regard.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a central processing unit; and
   a memory controller hub coupled to the central processing unit and a plurality of physical network interface devices, the memory controller hub to, during a low power mode of the apparatus:
   receive an incoming packet from a particular physical network device of the plurality of physical network interface devices;
   in response to receiving the incoming packet, determine whether a particular service associated with the incoming packet is registered as available in the low power mode, wherein the particular service is associated with the particular physical network device of the plurality of physical network interface devices;
   in response to a determination that the particular service associated with the incoming packet is registered as available in the low power mode, transmit a response to the incoming packet without exiting the low power mode of the apparatus,
   wherein each of the plurality of physical network devices is to receive and forward a plurality of incoming packets to the memory controller hub while the apparatus is in the low power mode, the plurality of physical network interface devices including at least two different types of network interfaces.

2. The apparatus of claim 1, wherein the memory controller hub is further to:
   in response to a determination that the particular service associated with the incoming packet is not registered as available in the low power mode, drop the incoming packet without exiting the low power mode of the apparatus.

3. The apparatus of claim 1, wherein the memory controller hub is to process the incoming packet based on matching the incoming packet to a plurality of different packet types.

4. The apparatus of claim 1, further comprising a non-volatile memory to store a table of services registered as available during the low power mode.

5. The apparatus of claim 3, wherein each of the plurality of different packet types is associated with one of the plurality of physical network interface devices.

6. The apparatus of claim 3, wherein each of the plurality of different packet types is associated with one of a plurality of applications executed by the central processing unit.

7. The apparatus of claim 4, wherein the memory controller hub is to access the table during the low power mode.

8. A method comprising:
   receiving configuration information regarding processing of different services during a low power state of a system, each of the different services associated with one of a plurality of disparate network devices of the system;
   storing the configuration information in a non-volatile memory accessible by a hub of the system in the low power state, the hub to receive packets during the low power state from the plurality of disparate network devices of the system;
   receiving, during the low power state, a packet in the hub from a particular network device of the plurality of disparate network devices of the system;
   in response to receiving the packet, accessing the configuration information in the non-volatile memory to determine whether a particular service associated with the incoming packet is registered as available in the low power state, wherein the particular service is associated with the particular network device of the plurality of disparate network devices;
   in response to a determination that the particular service associated with the incoming packet is registered as available in the low power mode, transmitting a response message to the packet without exiting the low power state.

9. The method of claim 8, further comprising, in response to the determination that the particular service is registered as available in the low power mode:

processing the packet with the hub without exiting the low power state.

10. The method of claim 9, wherein the processed packet is not sent to a central processing unit (CPU) of the system.

11. The method of claim 8, wherein each of the plurality of disparate network devices is associated with a different service of the system.

12. The method of claim 8, further comprising:
in response to a determination that the particular service is not registered as available in the low power mode, dropping the packet without exiting the low power state.

13. The method of claim 8, further comprising sending the response message, without exiting the low power state, to a source of the packet when the packet is a heartbeat message.

14. The method of claim 8, further comprising, in response to the determination that the particular service is registered as available in the low power mode, sending the packet to a predetermined location based on receiving the incoming packet associated with the particular service.

15. A system comprising:
a central processing unit (CPU) to execute instructions;
a plurality of physical network devices;
a hub coupled to the CPU, the hub to, during a low power mode of the system:
receive an incoming packet from a particular physical network device of the plurality of physical network interface devices;
in response to receiving the incoming packet, determine whether a particular service associated with the incoming packet is registered as available in the low power mode, wherein the particular service is associated with the particular physical network device of the plurality of physical network interface devices, the plurality of physical network devices including at least two different types of network interfaces; and
in response to a determination that the particular service associated with the incoming packet is registered as available in the low power mode, transmit a response to the incoming packet without exiting the low power mode of the system,
wherein each of the plurality of physical network devices is to receive incoming packets and forward the incoming packets to the hub while the system is in the low power mode.

16. The system of claim 15, further comprising a non-volatile memory to store a table of services registered as available during the low power mode.

17. The system of claim 15, wherein the hub is to process the incoming packet based on matching the incoming packet to a plurality of different packet types.

18. The system of claim 15, wherein the hub is further to:
in response to a determination that the particular service associated with the incoming packet is not registered as available in the low power mode, drop the incoming packet without exiting the low power mode of the system.

19. The system of claim 16, wherein the hub is to process the incoming packet by forwarding the incoming packet to a location specified by the table.

20. The system of claim 15, wherein the hub is included in a chipset of the system.

* * * * *